United States Patent [19]

Matzner

[11] Patent Number: 5,481,578
[45] Date of Patent: Jan. 2, 1996

[54] PERFORATED TUBE DEBRIS CATCHER FOR A NUCLEAR REACTOR

[75] Inventor: Bruce Matzner, San Jose, Calif.

[73] Assignee: General Electric Company, Schenectady, N.Y.

[21] Appl. No.: 330,614

[22] Filed: Oct. 28, 1994

Related U.S. Application Data

[63] Continuation of Ser. No. 264,879, Jun. 24, 1994, abandoned.

[51] Int. Cl.$^6$ ............................. G21C 3/32; G21C 15/00
[52] U.S. Cl. ........................ 376/313; 376/352; 376/443; 376/446
[58] Field of Search ...................... 376/438, 352, 376/313, 446, 440, 443

[56] References Cited

U.S. PATENT DOCUMENTS

| | | |
|---|---|---|
| 3,528,885 | 9/1970 | Kumpf . |
| 3,725,199 | 4/1973 | Notari et al. . |
| 3,801,453 | 4/1974 | Jones . |
| 3,840,051 | 10/1974 | Akashi et al. . |
| 3,878,870 | 4/1975 | Atherton et al. . |
| 3,879,259 | 4/1975 | Persson et al. . |
| 3,945,883 | 3/1976 | Hind et al. . |
| 4,053,358 | 10/1977 | Pennell . |
| 4,053,359 | 10/1977 | Pennell et al. . |
| 4,076,586 | 2/1978 | Bideau et al. . |
| 4,096,032 | 6/1978 | Mayers et al. . |
| 4,420,457 | 12/1983 | Le Pargneaux . |
| 4,772,447 | 9/1988 | Manson et al. . |
| 4,781,884 | 11/1988 | Anthony . |
| 4,828,791 | 5/1989 | DeMario . |
| 4,849,161 | 7/1989 | Brown et al. . |
| 4,900,507 | 2/1990 | Shallenberger et al. . |
| 5,009,839 | 4/1991 | King . |
| 5,024,806 | 6/1991 | Cioffi et al. ........................ 376/352 |
| 5,030,412 | 7/1991 | Yates et al. . |
| 5,037,605 | 8/1991 | Riordan, III . |
| 5,071,617 | 12/1991 | Bryan et al. ........................ 376/352 |
| 5,094,802 | 3/1992 | Riordan, III . |
| 5,100,611 | 3/1992 | Nylund ........................ 376/352 |
| 5,106,575 | 4/1992 | Nakamura et al. . |
| 5,128,096 | 7/1992 | Grattier . |
| 5,135,710 | 8/1992 | Grattier et al. . |

(List continued on next page.)

FOREIGN PATENT DOCUMENTS

| | | |
|---|---|---|
| 0289829 | 11/1988 | European Pat. Off. . |
| 0311037 | 4/1989 | European Pat. Off. . |
| 0455011A1 | 8/1990 | European Pat. Off. . |
| 0432738A1 | 6/1991 | European Pat. Off. . |
| 0435744A1 | 7/1991 | European Pat. Off. . |
| 54-19080 | 2/1979 | Japan . |
| 54-141989 | 11/1979 | Japan . |
| 57-102215 | 12/1980 | Japan . |
| 0162985 | 8/1985 | Japan . |
| 64-83189 | 3/1989 | Japan . |

Primary Examiner—Behrend E. Harvey
Attorney, Agent, or Firm—Nixon & Vanderhye

[57] ABSTRACT

A fuel bundle and lower tie plate assembly for a nuclear reactor includes a plurality of fuel rods supported between an upper tie plate and a lower tie plate assembly, the lower tie plate assembly including an upper grid portion and a lower body portion, the upper grid portion having a plurality of fuel rod supporting bosses interconnected by a plurality of webs thus forming flow openings between the bosses. The body portion includes an inlet nozzle and a peripheral wall extending between the bottom nozzle and the upper grid portion to define a flow volume therein. A debris catcher, including a plurality of perforated tubes, is incorporated into the lower tie plate assembly, such that one of the tubes is in abutment with a respective lowermost end of each of the plurality of fuel rod supporting bosses. The tubes are attached to a plate formed with openings corresponding to the open lower ends of the tubes so that coolant is forced to flow through the tubes in order to pass through the grid portion of the lower tie plate. The openings in the tubes cause the coolant to change direction, thus trapping debris in the tubes and effectively preventing debris from passing through the lower tie plate assembly.

13 Claims, 3 Drawing Sheets

U.S. PATENT DOCUMENTS

| | | | |
|---|---|---|---|
| 5,154,879 | 10/1992 | Grattier | 376/352 |
| 5,160,697 | 11/1992 | Verdier et al. | |
| 5,180,545 | 1/1993 | Grattier . | |
| 5,219,517 | 6/1993 | Nylund . | |
| 5,230,861 | 7/1993 | Nylund . | |
| 5,282,231 | 1/1994 | Adams et al. . | |
| 5,345,483 | 9/1994 | Johansson et al. | 376/313 |

PERFORATED TUBE DEBRIS CATCHER FOR A NUCLEAR REACTOR

This is a continuation of application Ser. No. 08/264,879, filed Jun. 24, 1994, now abandoned.

TECHNICAL FIELD

The present invention relates to a lower tie plate assembly for a nuclear reactor fuel bundle, and particularly to a debris catcher incorporated within the lower tie plate assembly, the debris catcher formed by perforated tubes abutting the underside of the lower tie plate grid. The grid and the debris catcher are constructed to afford minimum pressure loss for coolant flow through the lower tie plate assembly and into the fuel bundle region downstream of the lower tie plate assembly.

BACKGROUND

Boiling water nuclear reactors have been in operation for many years. Commencing with their initial construction and throughout their service lives, these reactors have been known to accumulate debris in their closed circulation moderator (coolant) systems. This debris can become an operating hazard if allowed to enter into the fuel bundle core region containing the heat generating fuel rods. In fact, debris is a leading cause of fuel rod failure in boiling water nuclear reactors (BWR's). In order to understand this problem, a summary of reactor construction as it relates to the accumulation of debris in the core needs will be helpful. Thereafter, the fuel bundle construction will be described with emphasis on the need to preserve substantially unchanged the regions of pressure drop within the fuel bundles. The effects caused by debris entering into the fuel rod region of the fuel bundles will then be summarized.

In boiling water nuclear reactor construction, the reactor is provided with a large, central core. Liquid water coolant/moderator flow enters the core from the bottom and exits the core as a water steam mixture from the top. The core includes many side-by-side fuel bundles, each containing a plurality of fuel rods. Water is introduced into each fuel bundle through a fuel bundle support casting from a high pressure plenum situated below the core. Water passes in a distributed flow through the individual fuel bundles and about the fuel rods where it is heated to generate steam, and then exits the upper portion of the core as a two-phase water steam mixture from which the steam is extracted for the generation of energy.

The core support castings and fuel bundles are a source of pressure loss in the circulation of water through the core. By properly controlling such pressure losses, substantially even distribution of flow across the individual fuel bundles of the reactor core is achieved. When it is remembered that there are as many as 750 individual fuel bundles in a reactor core, it can be appreciated that assurance of the uniformity of flow distribution is important. To interfere with the existing pressure drop within the fuel bundles could negatively affect the overall distribution of coolant/moderator within the fuel bundles of the reactor core.

The fuel bundles for a boiling water nuclear reactor are typically supported between lower and upper tie plate assemblies. The lower tie plate assembly is a one- or two-piece structure including a) an upper grid and 2) a lower inlet nozzle and associated structure providing a transition region from the inlet nozzle to the grid. The inlet nozzle provides for coolant entry to an enlarged flow volume within the flow transition region of the lower tie plate assembly. At the upper end of the flow volume, there is located a tie plate grid. The tie plate grid has two purposes. First, it provides a mechanical support connection for the weight of the individual fuel rods to be transmitted through the lower tie plate assembly to the fuel support casting. Secondly, the tie plate grid provides a path for liquid water moderator to flow into the fuel bundle region for passage between the side-by-side supported fuel rods.

Above the lower tie plate grid, each fuel bundle includes a matrix of upstanding fuel rods, each containing fissionable material which, when undergoing nuclear reaction, transfers energy to the flowing water to produce the power generating steam. The matrix of upstanding fuel rods is engaged at its upper end by the upper tie plate assembly. Usually, water rods also extend (within the fuel rod matrix) between the upper and lower tie plate assemblies for improvement of the water moderator to fuel ratio, particularly in the upper region of the fuel bundle.

Fuel bundles also include a number of fuel rod spacers at varying elevations along the length of each bundle. These spacers are required because the fuel rods are long (about 160 inches) and slender (about 0.4 to 0.5 inches in diameter), and would come into abrading contact under the dynamics of fluid flow and nuclear power generation. The spacers provide appropriate lateral restraints for each fuel rod at their respective elevations and thus prevent abrading contact between the fuel rods and maintain the fuel rods at uniform spacing relative to one another along the length of the fuel bundle for optimum performance. It will be appreciated that these spacers are sites where debris can be trapped and damage the fuel rods.

Each fuel bundle is surrounded by an elongated channel. This channel confines water flowing between the upper and lower tie plate assemblies to a single bundle in an isolated flow path. The channel also serves to separate the steam generating flow path through the fuel bundles from the surrounding core bypass region used for the penetration of the control rods. The water in the bypass region also provides neutron moderation.

In the operation of a boiling water nuclear reactor, maintenance of the originally designed flow distribution is very important. Specifically, from the core inlet to the core outlet, about 20 pounds per square inch (psi) of the pressure drop is encountered at typical flow operating conditions. About 7 to 8 psi of this pressure drop occurs through the inlet orifice and fuel support casting. This pressure drop is mainly to assure the uniform distribution of coolant/moderator flow through the many fuel bundles making up the core of the reactor, and is related to the prevention of operating instabilities within the reactor at certain power rates. At the lower tie plate assembly of each fuel bundle, from the inlet nozzle into the flow volume and through the tie plate grid, about 1 to 1½ psi pressure drop occurs which contributes to uniform flow distribution between the individual fuel rods of each fuel bundle. Finally, through the fuel bundle itself—from the exit of the lower tie plate assembly to the exit at the upper tie plate assembly—about 11 psi of pressure drop usually occurs. When new fuel bundles are introduced into a reactor core, these flow resistances must be preserved. Otherwise, the coolant/moderator flow distribution could be compromised among the various types of fuel in the reactor core.

With respect to the tie plate grid of the lower tie plate assembly, a matrix of cylindrical bosses and webs generally form the grid. The bosses are sized to receive the fuel rod end plugs. The flow area between the bosses and webs is the primary factor in controlling pressure drop resulting from water flow through the grid.

In early grid constructions, the fuel rods had greater cross-sectional diameters and the bosses were large. In more recent grid constructions, however, the fuel rods have smaller cross-sectional diameters and the bosses are smaller. Also, in early constructions, fewer fuel rods formed a fuel bundle than in recent constructions.

Even with all of these changes in grid and bundle construction, however, it is necessary to avoid significant changes in pressure drop. For example, a core may be composed of older (8×8) bundles and newer (10×10) bundles, and the flow through each bundle preferably is uniform. One challenge with new fuel bundle constructions, and particularly lower tie plate grid constructions, is to accommodate more fuel rods and to perform a debris catching function, yet maintain a flow rate substantially equivalent to the flow experienced in older bundle constructions.

Typically, debris within boiling water nuclear reactors can include extraneous materials left over from reactor construction, and outage maintenance and repair activities. During the numerous outages and repairs, even further debris accumulates. Because nuclear reactors constitute closed circulation systems, it will be appreciated that debris will essentially accumulate with increasing age and use of the reactor. A particularly vexing but usual place for the accumulation of debris is in the fuel bundles between the fuel rods, and particularly in the vicinity of the fuel rod spacers. Debris particles tend to lodge between the spacer structure and the fuel rods and often dynamically vibrate with the coolant/moderator flow in abrading contact to the sealed cladding of the fuel rods.

SUMMARY OF THE INVENTION

The present invention relates to a lower tie plate assembly incorporating a unique debris catcher which results in little if any additional flow resistance and attendant pressure drop. The lower tie plate assembly includes the usual upper pad which forms the lower tie plate grid and a lower pad which forms the lower tie plate flow volume and lower inlet orifice or nozzle. The upper and lower parts may be secured together by suitable means, such as welding. Before describing the debris catcher in any detail, however, a further brief discussion of the grid construction will be helpful.

As mentioned above, the lower tie plate grid supports the fuel rods in a manner enabling a smooth, substantially uniform expansion of coolant flow into the channeled fuel bundle. To accomplish the latter, a plurality of laterally spaced, generally cylindrical bosses defining through openings, extend between upper and lower surfaces of the lower tie plate grid and receive lower ends of the fuel rods. Webs also extend between those surfaces and interconnect the bosses. The bosses are arranged on vertical centerlines arranged at the corners of square matrices, with the webs extending linearly between the bosses along the sides of the square matrices. Convex portions of the cylindrical bosses extend between the right angularly related webs of each matrix. Thus, the webs and the convex portions of the bosses of the upper portion of the lower tie plate grid define coolant flow openings or flow areas between the bosses.

In accordance with this invention, a debris catcher is provided immediately upstream of the lower tie plate grid, within the flow volume of the lower tie plate assembly. The debris catcher is formed by a plurality of perforated, cylindrical tubes, one for each boss in the grid. Each tube has an open lower end and, for those lower tie plate designs where the fuel rod end plugs rest on the bosses, a closed or capped upper end. For those lower tie plate designs where the fuel rod end plugs are threadably received within the grid bosses, the tubes may be open at their respective upper ends. In either case, the upper ends of the tubes may be secured to the grid bosses by a welded, slip fit, screw thread or other suitable connection. The cylindrical side wall of each tube is provided with perforations or apertures substantially uniformly distributed about the entire periphery of the side wall. In an exemplary embodiment, the tubes may be in the range of from about 0.50 to about 1.0 inch in length, and may have outside diameters substantially equal to the boss diameters.

At the upstream ends of the perforated tubes (i.e., the lowermost ends, located remote from the grid), the tubes are attached by any suitable means (welding, screw thread, etc.) to a plate having chambered holes corresponding to a typical flow nozzle shape corresponding to the tubes but closing off all flow between the tubes. This plate is also secured about its periphery to the inside surface of the peripheral wall defining the lower tie plate flow volume, so that no significant size debris particles can flow between the inner wall of the flow volume and the plate. It will be appreciated that the tubes and plate may be preassembled and then secured within the flow volume of the lower tie plate assembly, such that the debris catcher tubes abut, but are not otherwise fixed to, the bosses on the underside of the grid.

With the above described construction, it will be appreciated that substantially all coolant flow is forced to flow into the debris catcher tubes, change direction to flow out through the perforations in the tube sidewalls, and then resume upward flow through the coolant flow spaces between the bosses in the tie plate grid. Any debris in the coolant flow above a predetermined size will be caught in the debris catcher tubes and thus prevented from flowing upwardly into the channeled fuel rod bundle.

In accordance with a broad aspect of the invention, therefore, there is provided a lower tie plate assembly for a nuclear reactor comprising an upper grid portion and a lower body portion, the upper grid portion having a plurality of fuel rod supporting bosses separated by flow openings, and the body portion including a bottom nozzle and a peripheral wall extending between the bottom nozzle and the upper grid portion to define a flow volume therein; and a debris catcher including a plurality of perforated tubes having open lower ends, one of said perforated tubes abutting a lowermost end of each of the plurality of fuel rod supporting bosses.

In accordance with another aspect of the invention, there is provided a fuel bundle and lower tie plate assembly for a nuclear reactor comprising a plurality of fuel rods supported between an upper tie plate and a lower tie plate assembly, the lower tie plate assembly comprising an upper grid portion and a lower body portion, the upper grid portion having a plurality of fuel rod supporting bosses interconnected by a plurality of webs thus forming flow openings between the bosses; the body portion including an inlet nozzle and a peripheral wall extending between the bottom nozzle and the upper grid portion to define a flow volume therein; and a debris catcher including a plurality of perforated tubes, one of the tubes engaging and extending downwardly from a lowermost end of each of the plurality of fuel rod supporting bosses.

The invention as described combines low flow resistance with high debris catching capability in a relatively simple design. Other objects and advantages of the invention will become apparent from the description which follows.

BEST MODE FOR CARRYING OUT THE INVENTION

Figure 1:
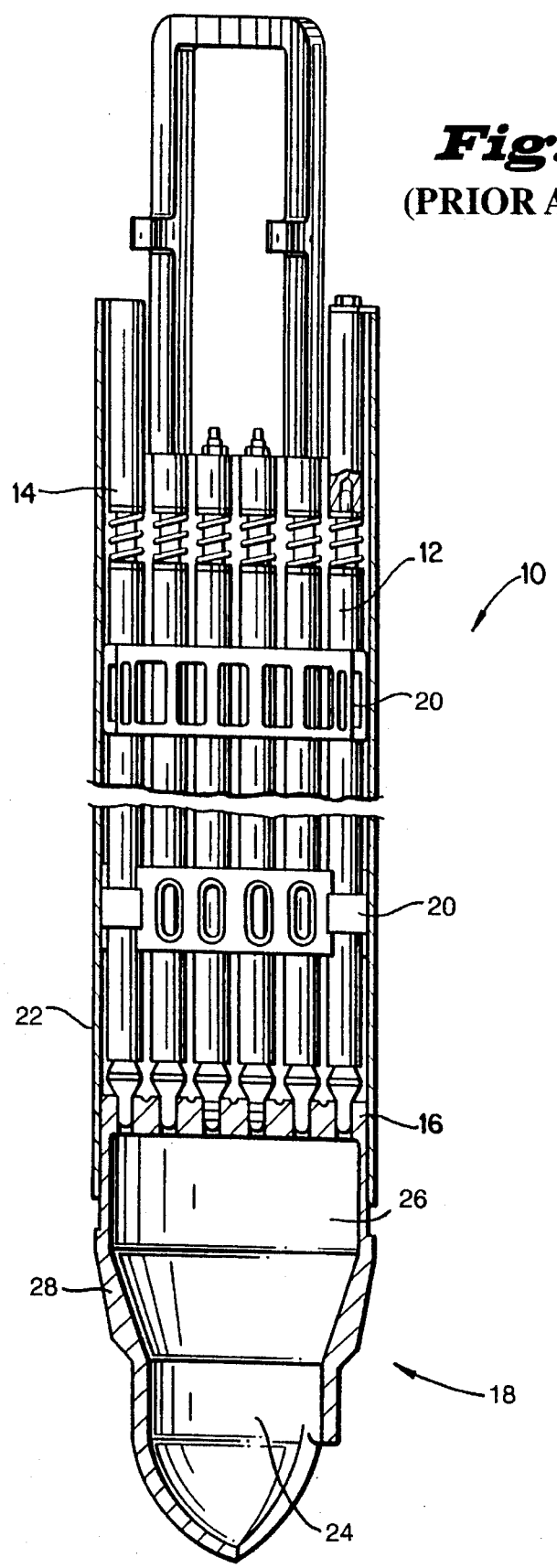
FIG. 1 is a partial side elevation, partly in section, of a typical fuel bundle for a boiling water nuclear reactor.

Referring now to FIG. 1, a representative example of a fuel assembly is shown generally at 10. The assembly includes a plurality of fuel rods 12 forming a bundle. The rods 12 are connected at their upper ends to an upper tie plate 14 and are supported at their lower ends by a lower tie plate grid, generally designated 16, which forms part of a lower tie plate assembly, generally designated 18. Spacers 20 are arranged at a plurality of vertically spaced locations to maintain lateral spacing of the fuel rods 12 relative to one another. The fuel bundle is disposed within a fuel bundle channel 22 whereby coolant water introduced through the bottom nozzle or inlet opening 24 of the tie plate assembly 18 flows upwardly through a flow volume 26 defined by a peripheral wall 28 of the lower tie plate assembly 18, through the lower tie plate grid 16, and then along and about the fuel rods 12. As indicated previously, it is important that debris in the coolant be prevented from flowing through the lower tie plate assembly and into the area between the channeled fuel rods 12.

Figure 2:
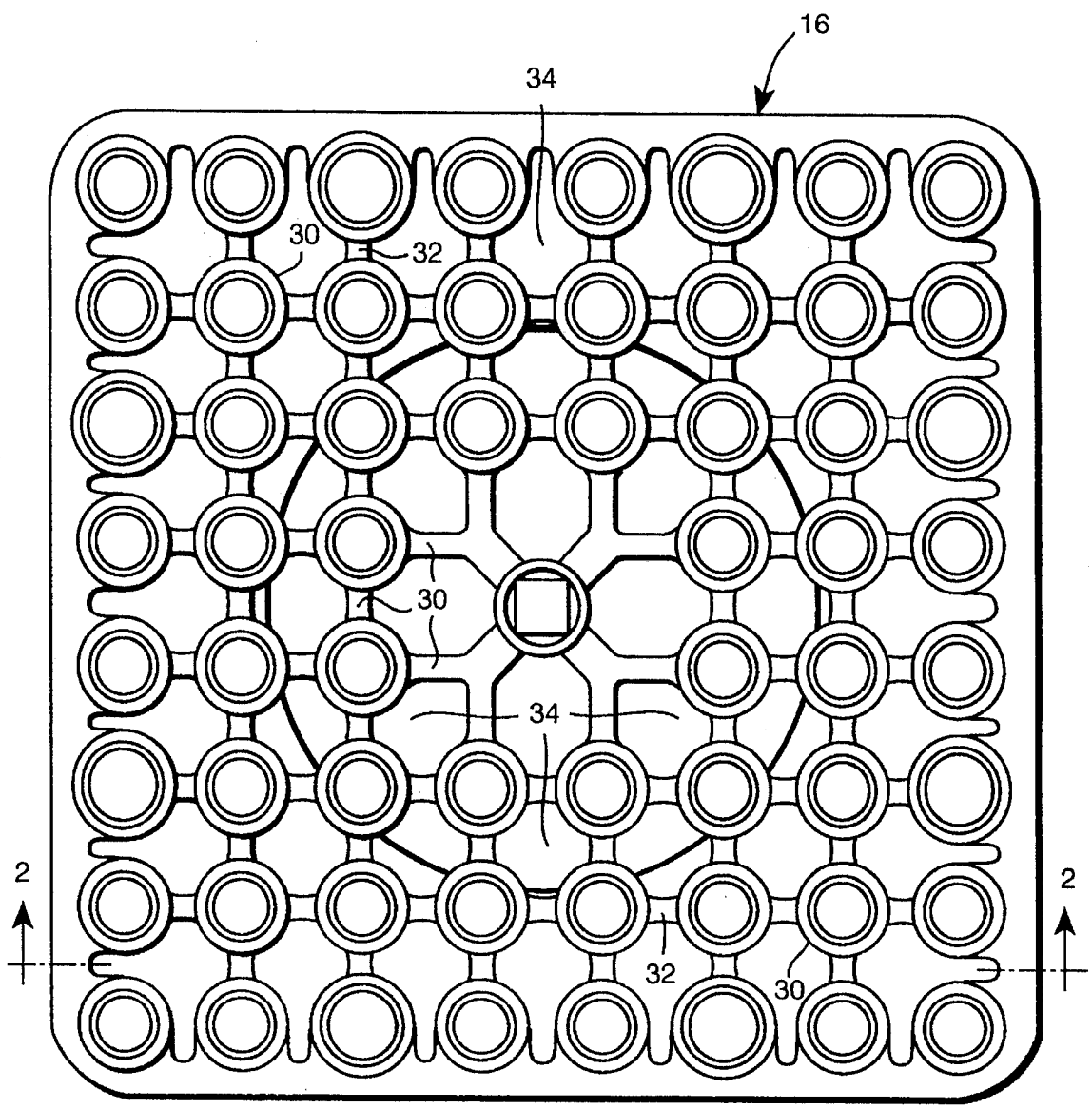
FIG. 2 is a plan view of the lower tie plate assembly as utilized in the fuel bundle of FIG. 1.
Figure 3:
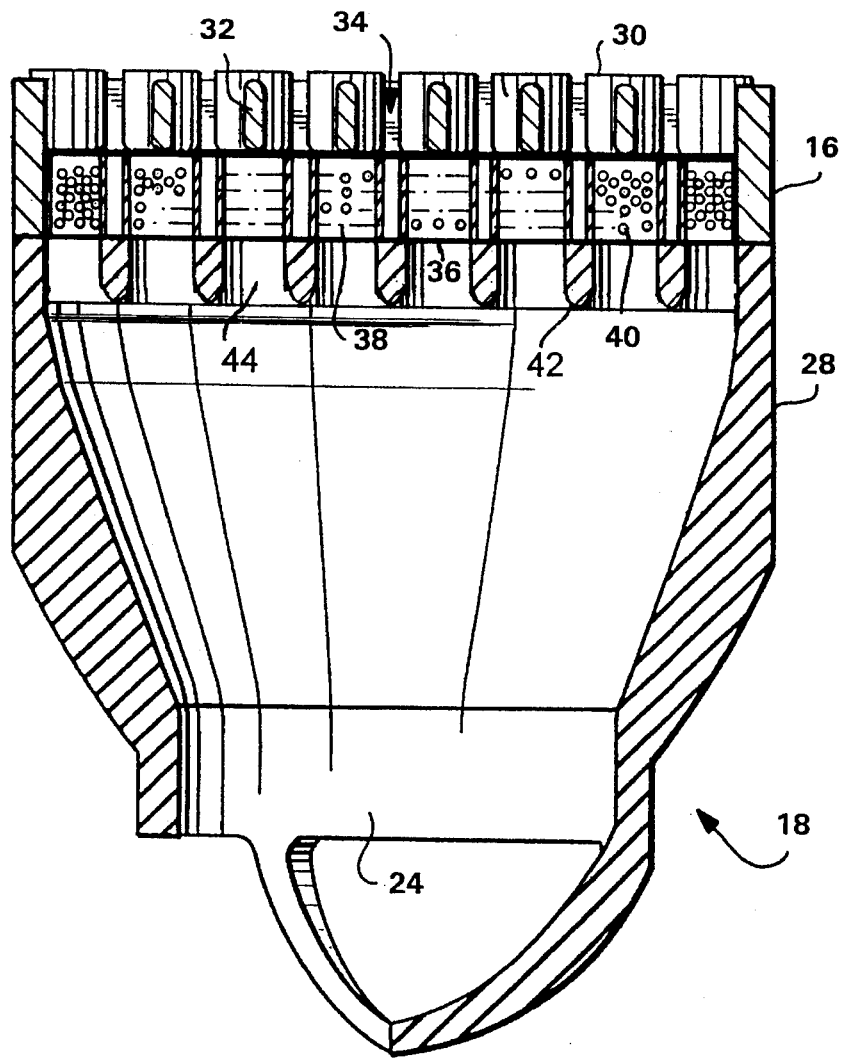
FIG. 3 is a side section of a lower tie plate assembly incorporating the debris catcher of this invention.

Referring now to FIGS. 2 and 3, there is illustrated a lower tie plate grid 16 according to the present invention, forming a part of the lower tie plate assembly 18. Lower tie plate grid 16 is preferably formed separately from the lower portion (including the peripheral wall 28 and the bottom nozzle 24) of the assembly, and secured thereto by, for example, welding. The lower tie plate grid 16 supports the fuel rods 12 above the grid and to this end, the grid 16 includes a plurality of generally cylindrical, vertically extending bosses 30 having centerlines arranged at corners of substantially square matrices of such bosses. Interconnecting (and forming the sides of) the square matrices are webs 32 adjoining the adjacent cylindrical bosses 30 along radial lines of the bosses 30 and extending between the upper and lower surfaces of the grid 16. Consequently, it will be seen that the webs 32 have portions formed along the sides of each square matrix and, together with convex outer portions of the cylindrical bosses 30, define side walls of openings or flow areas 34 which permit coolant to flow through the grid 16 and into the channeled fuel bundle assembly.

Figure 5:
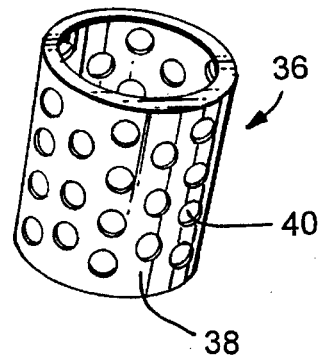
FIG. 5 is a perspective view of a debris catching tube component in accordance with the invention.

The debris catching function is performed by a plurality of perforated tubes 36 (see FIG. 5), each having a cylindrical shape including a peripheral wall 38 formed with a plurality of substantially uniformly distributed perforations or flow openings 40. Each tube 36 is open at its lower end and, depending on how the fuel rods 12 are secured to the grid 16, may have open or closed upper ends. More specifically, for those lower tie plate arrangements where the fuel rod end plugs are simply supported by the bosses 30 of the grid 16, the upper ends of the tubes 36 will be closed or capped, and the tubes may be secured by any suitable means to the lowermost ends of the bosses 30. For those lower tie plate configurations, however, where the fuel rod end plugs are threaded into the grid bosses 30, the tubes may be formed with open upper ends (as shown in FIG. 5) and, again, the tubes 36 may be secured to the bosses 30 by any suitable means.

Figure 4:
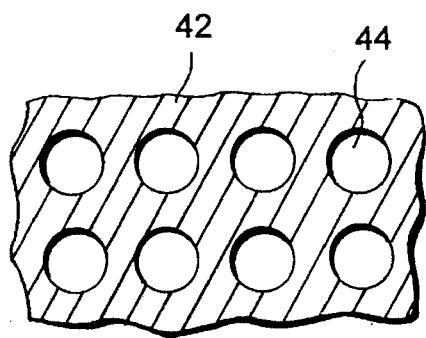
FIG. 4 is a partial plan of a plate forming part of the debris catcher of this invention.

A plate 42 (see FIG. 4) is secured to the upstream or lowermost ends of the array of tubes 36, such that flow openings 44 formed in the plate are aligned with the tube ends. The plate 42 is also sized and shaped so that it can be secured continuously about its periphery to the inner surface of the wall 28 of the lower tie plate assembly. In this way, substantially all coolant is constrained to flow into the tubes 36, through perforations or flow openings 40 and then through the flow areas 34 in the grid 16 and finally, upwardly into the fuel rod bundle.

In alternative arrangements, the tubes 36 may be secured initially to the plate 42 and then plate 42 can be secured to the inner surface of wall 28. In this arrangement, the downstream ends of tubes 36 need only abut the underside of the grid, such that flow induced vibrations are held within acceptable limits. It will be appreciated that some leakage either in the area of plate 42 or at the tube/grid interface can be tolerated, so long as flow rate and pressure drop are not significantly altered.

It is significant to the debris catching function of the tubes 36 that the coolant is forced to change direction in order to exit the tubes. In other words, as the flow direction changes substantially 90°, momentum of the debris entering the tubes 36 will generally carry the debris past the perforations 40 and impinge on the closed upper end of the tube or on the lower surface of the fuel rod end plug. Some debris, of course, may be too large to pass through the openings 40 in any event, while other debris of the long narrow type may have a cross-sectional area which might otherwise pass through the openings, but is nevertheless unable to negotiate the tortuous path through the tubes 36. Thus, the debris catcher effectively prevents debris from entering the fuel bundle area.

With regard to pressure drop across the debris catcher, the flow area through the tubes 36 (i.e., through openings 40) is directly proportional to the axial length of the tubes. Thus, the flow area can be made large enough to produce lower fluid velocities through the openings 40. The objective is to have the total area of openings 40 at least equal the flow area through the grid to minimize velocity changes. To achieve this goal, the tubes 36 should have an axial length of between about 0.5 and about 1.0 inch and a diameter approximately equal to the bosses 30. By increasing the tube length, even better flow characteristics can be achieved. It will be recognized, of course, that the configuration of the lower tie plate assembly places practical limitations on the lengths of the tubes 36, and that only so many holes or openings 40 can be provided in the tubes 36 before the structural integrity of the tubes is negatively impacted. With these caveats, the objective is nevertheless to maximize flow area of the tube openings relative to the area of the grid opening. The overall result is minimal or no additional flow resistance and thus little or no additional pressure drop attributable to the debris catcher.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit

What is claimed is:

1. A lower tie plate assembly for a nuclear reactor comprising:

an upper grid portion and a lower body portion, the upper grid portion having a plurality of fuel rod supporting bosses interconnected by a plurality of webs thus forming flow openings between the bosses; the body portion including an inlet nozzle and a peripheral wall extending between the bottom nozzle and the upper grid portion to define a flow volume therein; and a debris catcher including a plurality of perforated tubes having open lower ends, one of said perforated tubes in engagement with a lowermost end of each of said plurality of fuel rod supporting bosses.

2. The lower tie plate assembly of claim 1 wherein a plate is secured to lower ends of said perforated tubes, said plate having an array of openings therein aligned with the open lower ends of respective tubes, such that substantially all coolant flow is caused to flow through said perforated tubes.

3. The lower tie plate assembly of claim 1 wherein each tube has an axial length of between about 0.5 to about 1.0 inch.

4. The lower tie plate assembly of claim 1 wherein each tube includes a peripheral side wall having a plurality of openings therein substantially uniformly distributed about said peripheral side wall.

5. The lower tie plate assembly of claim 4 wherein upper ends of said tubes are capped.

6. The lower tie plate assembly of claim 2 wherein said plate is secured to an inside surface of said peripheral wall.

7. The lower tie plate assembly of claim 1 wherein each of said plurality of tubes is fixed to a respective boss.

8. A fuel bundle and lower tie plate assembly for a nuclear reactor comprising a plurality of fuel rods supported between an upper tie plate and a lower tie plate assembly, the lower tie plate assembly comprising an upper grid portion and a lower body portion, the upper grid portion having a plurality of fuel rod supporting bosses interconnected by a plurality of webs thus forming flow openings between the bosses; the body portion including an inlet nozzle and a peripheral wall extending between the bottom nozzle and the upper grid portion to define a flow volume therein; and a debris catcher including a plurality of perforated tubes having open lower ends, one of said perforated tubes in abutment with a lowermost end of each of said plurality of fuel rod supporting bosses.

9. The fuel bundle and lower tie plate assembly of claim 8 wherein a plate is secured to lower ends of said perforated tubes, said plate having an array of openings therein aligned with the open lower ends of respective tubes, such that substantially all coolant flow is caused to flow through said perforated tubes.

10. The fuel bundle and lower tie plate assembly of claim 9 wherein each tube has an axial length of between about 0.5 to about 1.0 inch.

11. The fuel bundle and lower tie plate assembly of claim 9 wherein each tube includes a peripheral side wall having a plurality of openings therein substantially uniformly distributed about said peripheral side wall.

12. The fuel bundle and lower tie plate assembly of claim 8 wherein each of said plurality of tubes is fixed to a respective boss.

13. The fuel bundle and lower tie plate assembly of claim 9 wherein said plate is secured substantially continuously about an inside surface of said peripheral wall.

* * * * *